(12) United States Patent
Zeng et al.

(10) Patent No.: US 8,565,502 B2
(45) Date of Patent: Oct. 22, 2013

(54) METHOD AND SYSTEM FOR RECONSTRUCTION OF TOMOGRAPHIC IMAGES

(75) Inventors: Kai Zeng, Clifton Park, NY (US); Jed Douglas Pack, Glenville, NY (US); Bruno Kristiaan Bernard DeMan, Clifton Park, NY (US); Zhye Yin, Schenectady, NY (US); Kyle Morgan Champley, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 282 days.

(21) Appl. No.: 13/149,732

(22) Filed: May 31, 2011

(65) Prior Publication Data

US 2012/0308101 A1 Dec. 6, 2012

(51) Int. Cl.
*G06K 9/00* (2006.01)

(52) U.S. Cl.
USPC .......................................... 382/128

(58) Field of Classification Search
USPC .................................. 382/128–134
See application file for complete search history.

(56) References Cited

U.S. PATENT DOCUMENTS

| | | | |
|---|---|---|---|
| 5,473,655 A * | 12/1995 | Hu | 378/4 |
| 7,660,380 B2 | 2/2010 | Boese et al. | |
| 7,672,421 B2 | 3/2010 | Chen et al. | |
| 7,711,083 B2 | 5/2010 | Heigl et al. | |
| 2003/0123718 A1* | 7/2003 | Edic et al. | 382/131 |
| 2004/0264625 A1* | 12/2004 | Basu et al. | 378/4 |
| 2007/0076928 A1* | 4/2007 | Claus et al. | 382/128 |
| 2007/0258122 A1* | 11/2007 | Chamgoulov et al. | 359/225 |
| 2011/0075905 A1* | 3/2011 | Noshi et al. | 382/131 |
| 2012/0308099 A1 | 12/2012 | Benson et al. | |
| 2012/0308100 A1 | 12/2012 | Pack et al. | |
| 2012/0308102 A1 | 12/2012 | Pack et al. | |

OTHER PUBLICATIONS

Hanson, Kenneth M., "Bayesian and Related Methods in Image Reconstruction from Incomplete Data", Image Recovery: Theory and Applications, H. Stark, ed. pp. 79-125 (Academic, Orlando, 1987).

Li, et al.; "3D Region-of-interest (ROI) Reconstruction from Truncated Data in Circular Cone-Beam CT", Nuclear Science Symposium Conference Record, pp. 5143-5146; Oct. 19-25, 2008, Dresden, Germany.

Sadowsky, et al.; "Hybrid Cone-Beam Tomographic Reconstruction: Incorporation of Prior Anatomical Models to Compensate for Missing Data", IEEE Transactions on Medical Imaging, vol. 30, Issue 1, pp. 69-83; Jan. 2011.

* cited by examiner

*Primary Examiner* — Alex Liew
(74) *Attorney, Agent, or Firm* — Marie-Claire B. Maple

(57) ABSTRACT

Approaches are described for generating an initial reconstruction of CT data acquired using a wide-cone system. The initial reconstruction may be processed (such as via a non-linear operation) to correct frequency omissions and/or errors in the reconstruction. Corrected frequency information may then be added to the reconstruction to improve the reconstructed image.

20 Claims, 8 Drawing Sheets

METHOD AND SYSTEM FOR RECONSTRUCTION OF TOMOGRAPHIC IMAGES

BACKGROUND

Non-invasive imaging technologies allow images of the internal structures of a patient or object to be obtained without performing an invasive procedure on the patient or object. In particular, technologies such as computed tomography (CT) use various physical principles, such as the differential transmission of X-rays through the target volume, to acquire image data and to construct tomographic images (e.g., three-dimensional representations of the interior of the human body or of other imaged structures). However, various physical limitations or constraints on acquisition may result in artifacts or other imperfections in the reconstructed image.

For example, third-generation cone-beam CT may suffer from cone-beam artifacts, particularly in the case of axial (circular) scan trajectories. These artifacts may arise from a variety of causes, such as truncation of data in the Z-direction (i.e., in the direction corresponding to the axis about which the X-ray source rotates about the patient), mishandled data, and/or missing frequencies.

BRIEF DESCRIPTION

In one embodiment, a method for processing tomographic image data is provided. In accordance with this method an initial volume is reconstructed from a set of axial scan data. The initial volume comprises incomplete frequency data. A modified volume is generated from the initial volume by applying a non-linear transformation. The non-linear transformation introduces frequencies missing from or corrupted in the initial volume. An artifact mask is generated that identifies artifact regions impacted by the frequencies missing from the initial volume. The initial volume and the modified volume are combined using a shift variant filtration process to produce a composite volume. The shift variant filtration replaces missing or corrupted frequency information in the initial volume using the corresponding estimated frequency information available in the modified volume. The composite volume is blended with the initial volume based on the artifact mask to generate a corrected volume.

In a further embodiment, one or more non-transitory computer-readable media are provided. The machine-readable media encode one or more routines which, when executed by a processor, cause the processor to perform acts comprising: reconstructing an initial volume from a set of axial scan data, wherein the initial volume comprises incomplete frequency data; generating a modified volume from the initial volume by applying a non-linear transformation, wherein the non-linear transformation introduces frequencies missing from the initial volume; generating an artifact mask, wherein the artifact mask identifies artifact regions impacted by the frequencies missing from the initial volume; combining the initial volume and the modified volume using a shift variant filtration process to produce a composite volume, wherein the shift variant filter replaces missing or corrupted frequency information in the initial volume using the corresponding estimated frequency information available in the modified volume; and blending the composite volume with the initial volume based on the artifact mask to generate a corrected volume.

In an additional embodiment, an image processing system is provided. The image processing system comprises a memory storing one or more routines and a processing component configured to execute the one or more routines stored the memory. The one or more routines, when executed by the processing component: reconstruct an initial volume from a set of axial scan data, wherein the initial volume comprises incomplete frequency data; generate a modified volume from the initial volume by applying a non-linear transformation, wherein the non-linear transformation introduces frequencies missing from the initial volume; generate an artifact mask, wherein the artifact mask identifies artifact regions impacted by the frequencies missing from the initial volume; combine the initial volume and the modified volume using a shift variant filtration process to produce a composite volume, wherein the shift variant filter replaces missing or corrupted frequency information in the initial volume using the corresponding estimated frequency information available in the modified volume; blend the composite volume with the initial volume based on the artifact mask to generate a corrected volume; and display an image based on the corrected volume. The image processing system further comprises a display in communication with the processing component for displaying the image.

BRIEF DESCRIPTION OF THE DRAWINGS

These and other features and aspects of embodiments of the present invention will become better understood when the following detailed description is read with reference to the accompanying drawings in which like characters represent like parts throughout the drawings, wherein.

DETAILED DESCRIPTION

Embodiments disclosed herein provide algorithms for the reconstruction of images from data collected using cone-beam computed tomography (CT). The algorithms may address artifacts attributable to one or more of truncation of data in the z-direction, mishandled data due to data redundancy, and/or missing frequency data. In accordance with certain embodiments, approaches are described for reconstructing image data in instances where some view data may be missing, such as in instances where there is data truncation. For example, an algorithm may be employed to patch in synthetic data for missing frequencies where the missing frequencies are caused by missing views due to data truncation. Recovery of the missing frequencies in the truncation region may be based on a non-linear transform of a first pass reconstruction. Since the missing frequency region depends on the location of the voxel, the patching process may be implemented as a shift-variant process. In one implementation, images may be processed region by region such that, within each region, the patching algorithm uses a different filter to patch in data for the missing frequencies. In one embodiment, only voxels close to the edge of the volume are processed, where truncation (i.e., missing views) is an issue.

The approaches disclosed herein may be suitable for use with a range of tomographic reconstruction systems. To facilitate explanation, the present disclosure will primarily discuss the present reconstruction approaches in the context of a CT system. However, it should be understood that the following discussion may also be applicable to other tomographic reconstruction systems.

Figure 1:
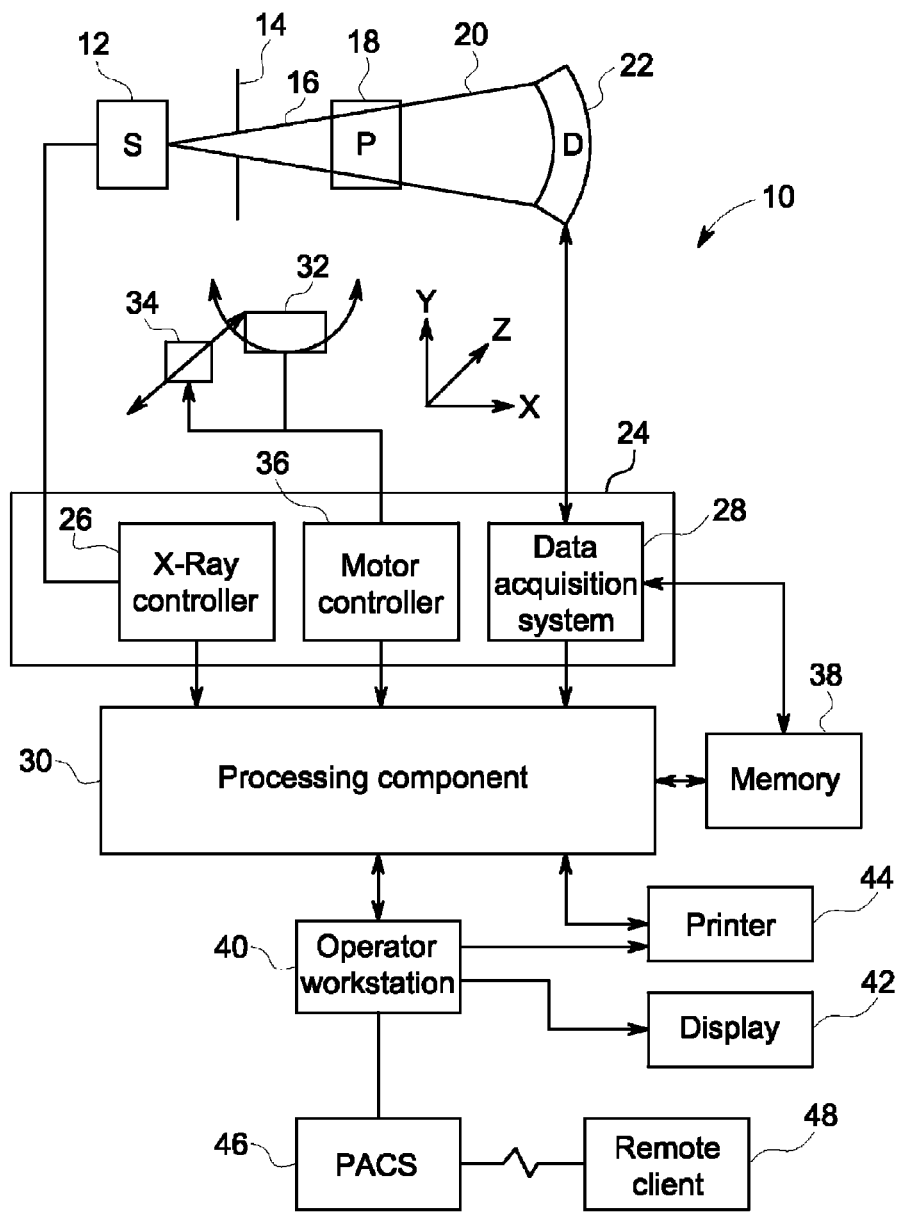
FIG. 1 is a diagrammatical view of a CT imaging system for use in producing images in accordance with aspects of the present disclosure.

With this in mind, an example of a computer tomography (CT) imaging system 10 designed to acquire X-ray attenuation data at a variety of views around a patient and suitable for tomographic reconstruction is provided in FIG. 1. In the embodiment illustrated in FIG. 1, imaging system 10 includes a source of X-ray radiation 12 positioned adjacent to a collimator 14. The X-ray source 12 may be an X-ray tube, a distributed X-ray source (such as a solid-state or thermionic X-ray source) or any other source of X-ray radiation suitable for the acquisition of medical or other images.

The collimator 14 permits X-rays 16 to pass into a region in which a patient 18, is positioned. In the depicted example, the X-rays 16 are collimated to be a cone-shaped beam, i.e., a cone-beam, that passes through the imaged volume. A portion of the X-ray radiation 20 passes through or around the patient 18 (or other subject of interest) and impacts a detector array, represented generally at reference numeral 22. Detector elements of the array produce electrical signals that represent the intensity of the incident X-rays 20. These signals are acquired and processed to reconstruct images of the features within the patient 18.

Source 12 is controlled by a system controller 24, which furnishes both power, and control signals for CT examination sequences. In the depicted embodiment, the system controller 24 controls the source 12 via an X-ray controller 26 which may be a component of the system controller 24. In such an embodiment, the X-ray controller 26 may be configured to provide power and timing signals to the X-ray source 12.

Moreover, the detector 22 is coupled to the system controller 24, which controls acquisition of the signals generated in the detector 22. In the depicted embodiment, the system controller 24 acquires the signals generated by the detector using a data acquisition system 28. The data acquisition system 28 receives data collected by readout electronics of the detector 22. The data acquisition system 28 may receive sampled analog signals from the detector 22 and convert the data to digital signals for subsequent processing by a processor 30 discussed below. Alternatively, in other embodiments the digital-to-analog conversion may be performed by circuitry provided on the detector 22 itself. The system controller 24 may also execute various signal processing and filtration functions with regard to the acquired image signals, such as for initial adjustment of dynamic ranges, interleaving of digital image data, and so forth.

In the embodiment illustrated in FIG. 1, system controller 24 is coupled to a rotational subsystem 32 and a linear positioning subsystem 34. The rotational subsystem 32 enables the X-ray source 12, collimator 14 and the detector 22 to be rotated one or multiple turns around the patient 18, such as rotated primarily in an x,y-plane about the patient. It should be noted that the rotational subsystem 32 might include a gantry upon which the respective X-ray emission and detection components are disposed. Thus, in such an embodiment, the system controller 24 may be utilized to operate the gantry.

The linear positioning subsystem 34 may enable the patient 18, or more specifically a table supporting the patient, to be displaced within the bore of the CT system 10, such as in the z-direction relative to rotation of the gantry. Thus, the table may be linearly moved (in a continuous or step-wise fashion) within the gantry to generate images of particular areas of the patient 18. In the depicted embodiment, the system controller 24 controls the movement of the rotational subsystem 32 and/or the linear positioning subsystem 34 via a motor controller 36.

In general, system controller 24 commands operation of the imaging system 10 (such as via the operation of the source 12, detector 22, and positioning systems described above) to execute examination protocols and to process acquired data. For example, the system controller 24, via the systems and controllers noted above, may rotate a gantry supporting the source 12 and detector 22 about a subject of interest so that X-ray attenuation data may be obtained at a variety of views relative to the subject. In the present context, system controller 24 may also includes signal processing circuitry, associated memory circuitry for storing programs and routines executed by the computer (such as routines for executing image processing techniques described herein), as well as configuration parameters, image data, and so forth.

In the depicted embodiment, the image signals acquired and processed by the system controller 24 are provided to a processing component 30 for reconstruction of images. The processing component 30 may be one or more conventional microprocessors. The data collected by the data acquisition system 28 may be transmitted to the processing component 30 directly or after storage in a memory 38. Any type of memory suitable for storing data might be utilized by such an exemplary system 10. For example, the memory 38 may include one or more optical, magnetic, and/or solid state memory storage structures. Moreover, the memory 38 may be located at the acquisition system site and/or may include remote storage devices for storing data, processing parameters, and/or routines for image reconstruction, as described below.

The processing component 30 may be configured to receive commands and scanning parameters from an operator via an operator workstation 40, typically equipped with a keyboard and/or other input devices. An operator may control the system 10 via the operator workstation 40. Thus, the operator may observe the reconstructed images and/or otherwise operate the system 10 using the operator workstation 40. For example, a display 42 coupled to the operator workstation 40 may be utilized to observe the reconstructed images and to control imaging. Additionally, the images may also be printed by a printer 44 which may be coupled to the operator workstation 40.

Further, the processing component 30 and operator workstation 40 may be coupled to other output devices, which may include standard or special purpose computer monitors and associated processing circuitry. One or more operator workstations 40 may be further linked in the system for outputting system parameters, requesting examinations, viewing images, and so forth. In general, displays, printers, workstations, and similar devices supplied within the system may be local to the data acquisition components, or may be remote from these components, such as elsewhere within an institution or hospital, or in an entirely different location, linked to the image acquisition system via one or more configurable networks, such as the Internet, virtual private networks, and so forth.

It should be further noted that the operator workstation 40 may also be coupled to a picture archiving and communications system (PACS) 46. PACS 46 may in turn be coupled to a remote client 48, radiology department information system (RIS), hospital information system (HIS) or to an internal or external network, so that others at different locations may gain access to the raw or processed image data.

While the preceding discussion has treated the various exemplary components of the imaging system 10 separately, these various components may be provided within a common platform or in interconnected platforms. For example, the processing component 30, memory 38, and operator workstation 40 may be provided collectively as a general or special purpose computer or workstation configured to operate in accordance with the aspects of the present disclosure. In such embodiments, the general or special purpose computer may be provided as a separate component with respect to the data acquisition components of the system 10 or may be provided in a common platform with such components. Likewise, the system controller 24 may be provided as part of such a computer or workstation or as part of a separate system dedicated to image acquisition.

As noted above, the reconstruction of images from data acquired by an imaging system, such as the depicted CT imaging system 10, may be subject to various limitations that may result in artifacts or other imperfections in the generated images. For example, the acquired data may be truncated in the z-direction in certain acquisition scenarios. In particular, in an axial (i.e., circular) cone-beam acquisition, certain of the voxels in the image volume will always be in the X-ray beam during the axial spin (such as those voxels near the mid-plane i.e., plane in which the X-ray focal spot moves) while other voxels are illuminated in certain of the views during the axial spin but not in others. For example, due to the narrow portion of the X-ray cone being closer to the X-ray source 12, (that is, the cone expands or diverges as distance from the source increases) a narrow segment of voxels near the X-ray 12 source may be illuminated while those voxels furthest from the source are fully or mostly illuminated due to being near the wide base of the cone. However, as the X-ray source is rotated axially about the volume, the portions of the volume that are near and far from the X-ray source 12 will also rotate, with the result being that the extent of X-ray illumination a voxel receives will be decrease with the distance of the voxel from the mid-plane of focal spot rotation. As a result, there is less data available with respect to the edges of the X-ray cone in the z-direction in an axial scan than for those voxels nearer the mid-plane of the cone in the z-direction. This data truncation in the z-direction may prevent the reconstruction of good quality images outside that portion of the volume which is always projected onto the detector during an axial scan.

For example, voxels close to the edge slices may have very limited data, i.e., even less than 180 degree of data, typically the minimum requirement for tomographic reconstruction. Therefore, extrapolation and image domain corrections are typically used to suppress artifacts. Traditionally, simple extrapolation is used in the projection domain, which makes the detector virtually bigger by replicating real data from the boundary row to virtual rows. However, this method only works perfectly for objects that are uniform in z. In practice, extrapolation introduces errors and strong streak artifacts are produced.

Figure 2:
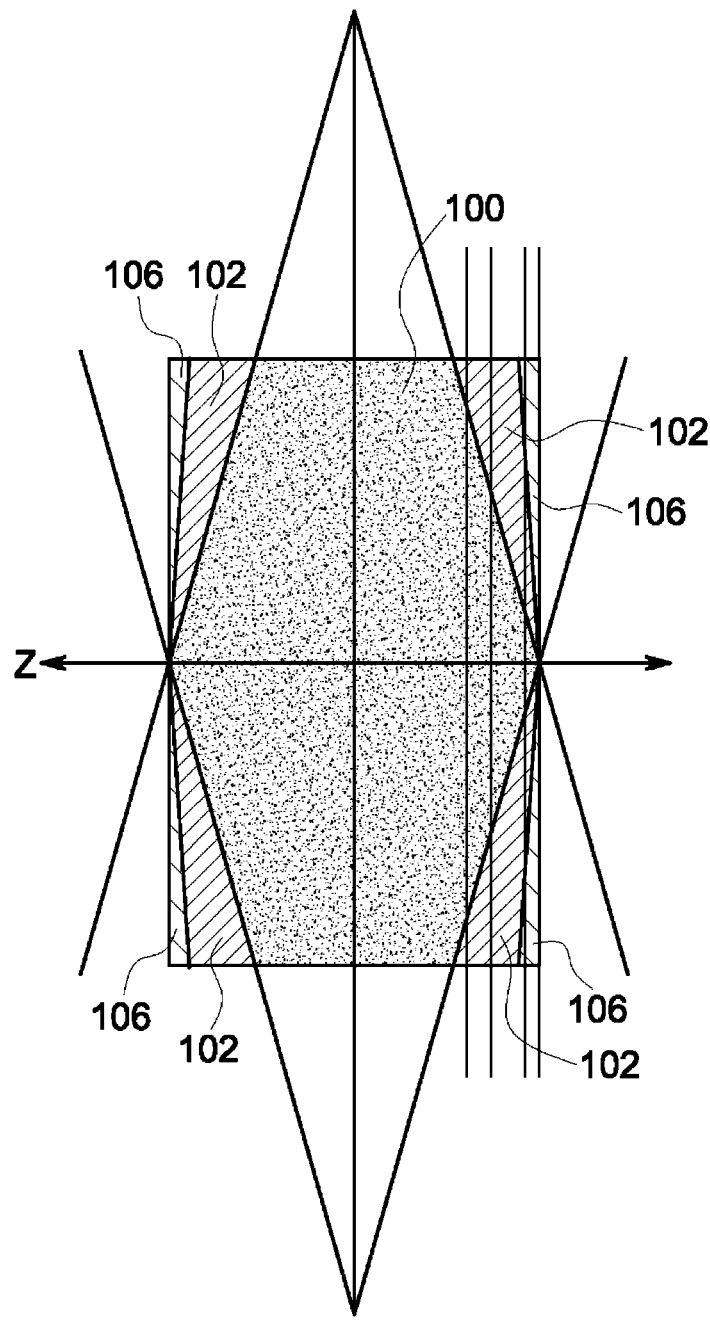
FIG. 2 depicts a representation of available data in the image domain obtained using a cone-beam CT system, in accordance with aspects of the present disclosure.

Some or all of the above-noted issues are addressed by the approaches discussed herein. By way of introducing certain aspects of these approaches, a brief review of system geometry of a cone-beam and the consequent available data in the Fourier domain is provided. In an axial scan of a cone-beam CT scanner, not all voxels are within the X-ray cone from all view angles due to the limited z-extent of the detector. For example, turning to FIG. 2, for an axial full-scan (i.e., a 360 degree axial rotation of the X-ray source and detector), region 100 is seen for the full 360 angular range. That is, for an axial full-scan region 100 provides 360 degrees of data. For an axial half-scan (i.e., a 180 degree+α rotation of the X-ray source and detector), region 100 yields at least 180 degree of data (but less than 360 degrees of data). For region 100, there is no z-truncation problem, though there may still be issues related to missing frequencies and/or mishandled data.

For region 102, an axial full-scan provides less than 360 degrees of data but more than 180 degrees of data. For an axial half-scan, region 102 provides less than 180 degrees of data. Thus, there may be substantial missing data in region 102 in the half-scan scenario and, even in the full-scan scenario the data is less than complete. Region 106 represents those voxels for which less than 180 degrees of data is measured regardless of whether a full-scan or a partial or half-scan is performed. As a result, image quality close to the edge slices will typically be poor, with strong streaks observed along the tangent direction.

Figure 3:
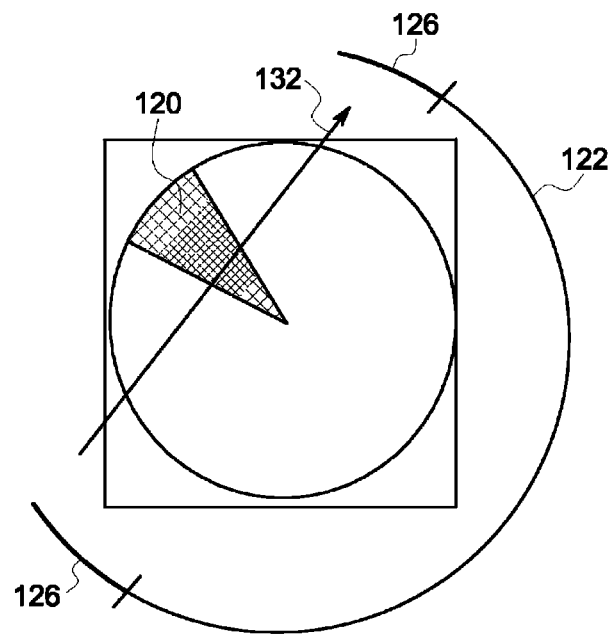
FIG. 3 depicts a representation of missing views in the image domain, in accordance with aspects of the present disclosure.
Figure 4:
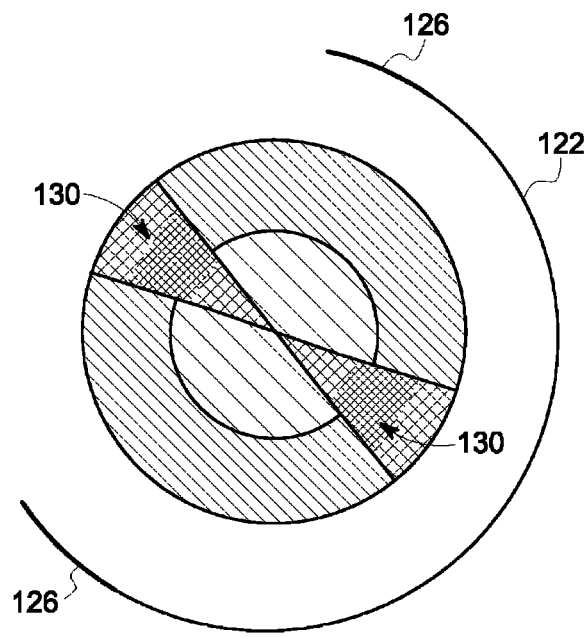
FIG. 4 depicts a representation of missing frequencies in the frequency domain corresponding to the image domain of FIG. 3, in accordance with aspects of the present disclosure.

By way of further example, FIGS. 3 and 4 depict an image domain (FIG. 3) and corresponding Fourier domain (FIG. 4) in which the image data is missing views in the edge slices. As depicted in FIG. 3, for voxels within region 120, the projection data is measured for views along arc 122 but is truncated for views along arcs 126 due to the limited z coverage of the detector, hence, extrapolated views will be used during the reconstruction. These missing views (i.e., region 120) in the image domain correspond to missing frequency data 130 in the Fourier domain (FIG. 4). The artifacts caused by these missing frequencies 130 will have an associated direction 132, as depicted in FIG. 3. In accordance with one approach discussed herein, data may be generated and used in place of the missing frequencies 130, such as by execution of a suitable algorithm.

Figure 5:
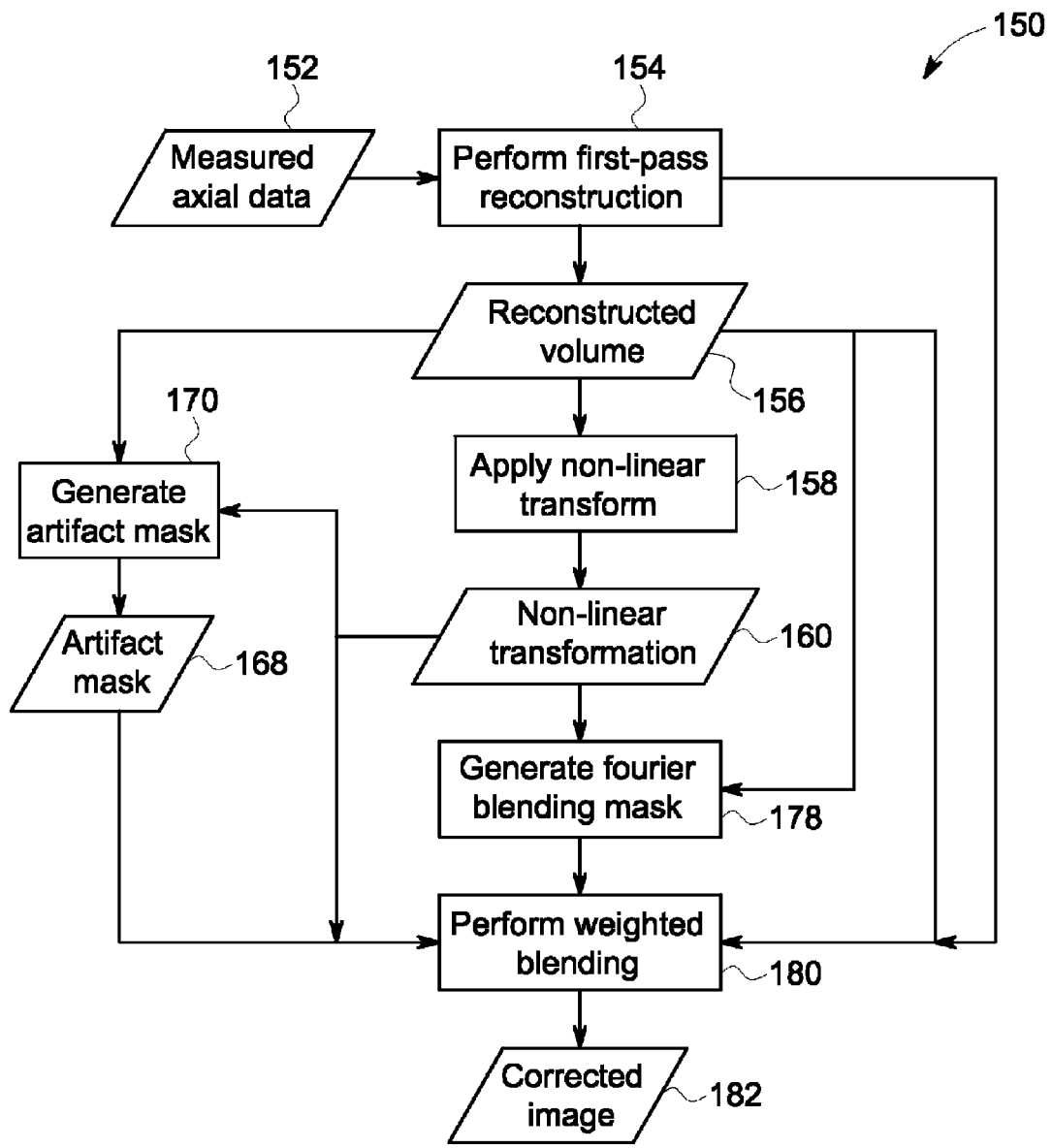
FIG. 5 depicts a flowchart describing one algorithm for implementing an image reconstruction process, in accordance with aspects of the present disclosure.

For example, turning to FIG. 5, a flowchart 150 depicts control logic suitable for implementation as a processor-executable algorithm for implementing aspects of the present disclosure. By way of example, the control logic of FIG. 5 may be implemented in Freemat or C. In accordance with one implementation of such an algorithm, an initial set of measured axial data 152, such as may be acquired by using a cone-beam CT system, is reconstructed (block 154) to generate an initial reconstructed volume 156. In one implementation the volume 156 is reconstructed by back-projection. In one embodiment, z-extrapolation is employed to generate additional data in the z-direction beyond the detector edge 194. In one implementation, this z-extrapolation may simply extend the last measured value in z 196 outward. This approach is suitable if the object in question is actually uniform in z beyond the edge 194 of the detector. Alternatively, the extrapolation step may be improved by reprojecting a previously reconstructed volume, such as a volume that includes information about what lies beyond the edge 194 of the detector.

A non-linear transformation step (block 158) may be employed to generate a non-linear transformation 160 (i.e., a cartoonized volume) that includes frequencies missing in the initial reconstructed volume 156. The non-linear transformation 160 may be implemented as a binning process or other quantization process, as discussed below. The missing frequencies can be used to reduce or eliminate artifacts. The missing frequency region (see FIG. 5) depends on the location of the voxel or voxels in question. Therefore, in one implementation, the patching process may be implemented as a shift-variant process. However, in other implementations where computational efficiency is a consideration, the images (i.e., reconstructed volumes 158) may be processed in pieces (i.e., region-by-region), and within each region a suitable space-invariant filter may be applied to patch in the missing frequencies for that region. In such an embodiment, a different space-invariant filter may be applied within each region though, if appropriate, some regions may employ the same space invariant filter.

With respect to the generation of the non-linear transformation 160, in one implementation recovery of missing data utilizes prior knowledge of the object being scanned. In the case of medical (and many other) CT images, this prior knowledge can include an assumption that the image is sparse in the histogram domain (i.e., that the true, i.e., artifact-free, image is dominated by voxels with values that are close to a small set of discrete values). For example, medical images typically include voxels having an intensity corresponding to air, water, lung, soft tissue, fat, and/or bone. Variations from this model that fall within the missing frequency region are likely artifacts.

The above observations suggest one mechanism for forming the non-linear transformation 160. In accordance with this approach, each voxel is categorized as either air, lung, soft tissue or bone. The intensities of each voxel are modified according to a set of rules for that tissue type. If the categorization of a given voxel is done strictly based on comparing the voxel intensity to a set of thresholds, the two steps (categorization and modification) can be combined into a single non-linear function.

For example, in one implementation of such a non-linear function, the Hounsfield (HU) values of the bone are left unchanged, i.e., this portion of the function may respond linearly. This is because the HU values of bone are much less uniform than the HU values of the other tissue types. Fortunately, bone tends to be a small percentage of the overall voxels so the impact of not having a stable intensity to assign to bone voxels is generally not too problematic. Unlike the values for bone, the values for voxels classified as water, fat, lung, or air may be set to defined values in one implementation of a non-linear function (i.e., these voxels are binned based on category and assigned a specified value based upon the binning process), though this may vary in other suitable functions.

With respect to artifacts in the images, the z-extrapolation method used in the back-projection step works well for objects that are uniform in z (i.e., for objects where the observed values at the edge really do extend beyond the edge in a uniform manner). For objects that are changing slowly in the z-direction, the artifacts may be small (i.e., the change from the observed or measured data is small and/or gradual in the z-direction). However, objects that are change strongly in the z-direction may create strong artifacts due to the failure of the observed data at the edge to properly account for the actual properties of the edge objects.

Another important aspect is the orientation of the high contrast objects generating the artifacts. For example, if an object's edges all fall within the measured region, no artifacts may result. However, if one or more of the edges of an object fall in the region where data is missing, artifacts may result. Thus, artifacts may appear when two conditions hold true: a gradient is present that has a z-component (i.e., a non-uniformity in z) and an x,y edge would be seen in one or more of the missing views. Based on these criteria, a set of artifact creating voxel locations can be identified. In one implementation, for identifying gradients with z-components, the non-linear transformation 160 may be employed as this image may place more emphasis on the gradients associated with bony structures. For identifying x,y edges that would be seen in one or more of the missing views, it may be useful to use the initial reconstructed volume 156, which provides accurate gradient direction. In one implementation, x,y edges that would be seen in one or more of the missing views may be identified in accordance with the equation $\mathrm{atan}(\mathrm{Grad}_y/\mathrm{Grad}_x)$.

Once the artifact-generating structures are identified an artifact mask 168 may be generated (block 170) which identifies the locations or regions that the artifact generating structures will impact. In one implementation an azimuthal smoothing operation is performed to approximate the possible artifact region on each two-dimensional image. The azimuthally blurred artifact-generating voxels are considered an estimation of the artifact region, i.e., the artifact mask 168. In certain embodiments where an artifact mask 168 is employed, only those voxels within the artifact mask 168 are processed or corrected in the Fourier blending operation (block 162).

In other implementations a 3D blurring operation may be employed to generate the artifact mask 168 instead of a 2D azimuthal blurring operation. In particular, the artifact generating voxels are expected to generate artifacts in three-dimensional space rather than a two-dimensional slice. Therefore, a more accurate artifact mask 168 could be computed in three-dimensions, including the spatial span of the artifacts and/or the magnitude of the artifact. This three-dimensional artifact information can be used to fine tune the generation of the non-linear transformation 160 (such as to adapt a thresholding operation based on the local artifact level).

Moreover, in certain implementations generation of the artifact mask 168 may include or take in to account a bone mask. In such implementations, it may be useful to leave the density in the bone or other high contrast structures unchanged. The bone mask may be generated by threshold (i.e., voxels having intensity values over a given threshold are designated as bone) combined with a filling operation. The filling operation prevents small, low-density pockets in the bone mask, which might also result in artifacts.

As noted above, the artifact mask 168 defines the region or regions to be corrected and to protect other regions to prevent inadvertent alteration of image regions where no correction is needed. The rationale for employing the artifact mask 168 is that even in the edge region where data is missing, a substantial portion of the image may not be contaminated by artifacts and therefore does not need correction.

After the artifact mask 168 is generated, Fourier blending may be employed to blend in data (i.e., missing frequencies) from the non-linear transformation 160 into the initial reconstructed volume 156 to generate a corrected image 182. In the depicted implementation, the blending operation is performed only on those regions where frequency data is missing and only in the artifact mask regions. As will be appreciated, the Fourier patching process may, at the extreme be performed voxel-by-voxel, to account for the differences between voxels.

However, in other embodiments, the process is performed slice by slice, sub-region by sub-region so a number of two-dimensional fast Fourier transforms (2D FFTs) and/or two-dimensional inverse fast Fourier transforms (2D IFFTs) may be performed. For example, 2D FFT may be performed for a group of voxels within a sub-region (i.e., Fourier blending). In one such approach, for each sub-region a Fourier blending mask 176 is generated (block 178) according to the missing frequency orientation. The blending mask 176 is then used to perform a weighted blending (block 180) such that data for the missing frequencies may be patched in to the initial reconstructed volume 156 from the non-linear transformation 160). In one implementation, the artifact regions in the initial reconstructed volume 156 are modified to the new blended image value with a smooth feathering weight.

While the preceding sets forth a framework for various approaches by which frequency data may be generated and used in place of frequency data otherwise missing from the measured image data, various speed and/or image quality enhancements may be implemented as part of these approaches. For example, in one implementation 2D parallel forward-projection, 1D ramp filteration, and 2D parallel back-projection (i.e., reprojection) of the difference of the non-linear transformation 160 and the initial reconstructed volumes 156 are used to replace 2D FFTs and IFFTs. In such an implementation, a voxel dependent weighted back-projector may be employed to handle the shift-variant nature of the patching step. In addition, Fourier-based techniques may be employed to implement fast forward-projection, ramp-filter and voxel dependent weighted back-projection algorithms.

Figure 6:
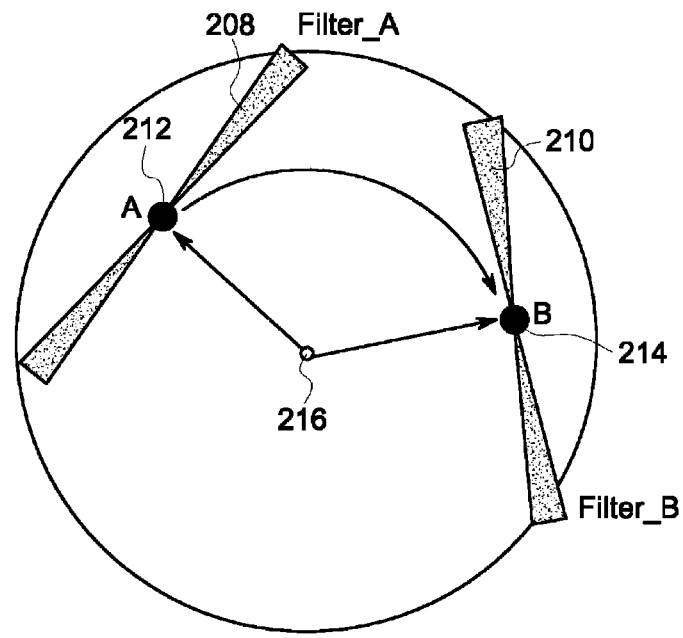
FIG. 6 depicts rotational symmetry in a frequency data patching step, in accordance with aspects of the present disclosure.
Figure 7:
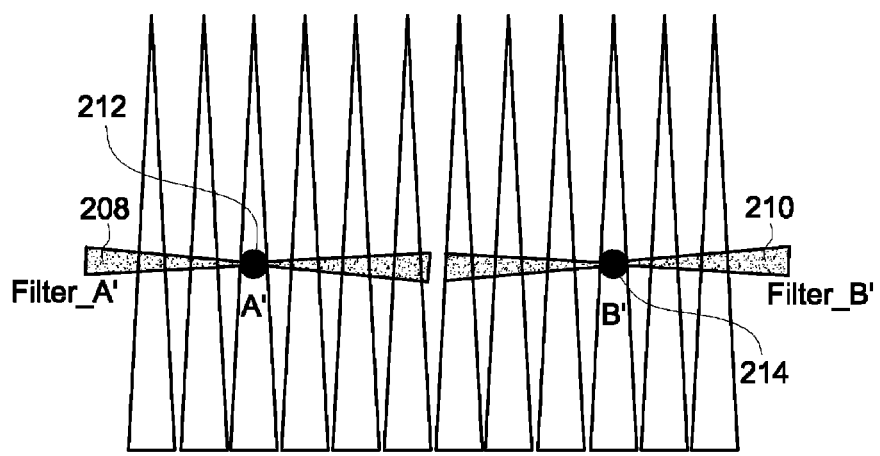
FIG. 7 depicts the image data and filters of FIG. 6 rebinned in a polar grid, in accordance with aspects of the present disclosure.

In a further embodiment, a polar coordinate based approach may be employed. For example, as depicted in FIG. 6, there is a rotational symmetry in the Fourier patching step, i.e., the filters 208, 210 for points 212, 214 with the same radius from the scanning iso-center 216 are rotational symmetric. Therefore, the filters 208, 210 are the same except, they are rotated relative to one another. Thus, this symmetry may result in some advantages to performing the filtration in a rebinned polar grid, as depicted in FIG. 7. In the polar grid, rebinned points 212 and 214 share exactly the same filter 208, 210. Therefore, in one implementation, the image may be rebinned into a polar grid and a shift-invariant filter applied to achieve similar results.

In another embodiment, a targeted (ROI) inverse discrete Fourier transform (IDFT) may be applied instead of applying an inverse fast Fourier transform (IFFT) to the whole image. Such an approach may result in reduced computational cost, i.e., improved computational efficiency. As in the Fourier blending step discussed above, for each voxel (or sub-region), a two-dimensional whole image IFFT is performed to obtain the voxel (or sub-region) value. However, values are only needed for certain of the voxels (such as one-half, one-third, one-fourth, one-fifth, or one-tenth of the voxels), as opposed to the entire image. Therefore, performing a targeted (ROI) inverse discrete Fourier transform (IDFT) type of inversion for only the voxels of interest (i.e., the non-zero portion of the Fourier domain filter) may reduce the computational cost. By way of example, Table 1 provides a computational cost comparison between whole image based IFFT-based approach and a voxel based IDFT approach where 0.1 is the estimate of non-zero portion of the Fourier domain filter.

TABLE 1

|  | FFT Approach | DFT Inversion Approach |
| --- | --- | --- |
| 1 Operation | $C \cdot N^2 \log(N)$ | $N^2 \times 0.1$ |
| Total Operations | $N^2 \log(N) \times (N_{pie} \cdot C)$ | $N^3 \times 0.1$ |

With respect to image quality enhancements, various approaches may be employed. For example, in one implementation an iterative filtered back-projection may be employed in conjunction with the non-linear transformation discussed above. In one such approach, a 3D filter is applied to patch in the missing data without corrupting those frequencies that are good, i.e., already complete. For example, a 3D volume 156 may be initially reconstructed, as described above, and a non-linear operation applied to the volume to generate a non-linear transformation 160. The initial 3D volume 156 may be subtracted from the non-linear transformation 160 to generate a difference image. The difference image may be back-projected (such as with a cone-beam/cone-parallel geometry) to the extrapolated rows to correct the zero order extrapolation (i.e., the initial extrapolation). With the corrected extrapolation data, the initial image may be reconstructed again, presumably with greater accuracy due to the correction of the extrapolation data. The non-linear transformation, generation of a difference image, correction of extrapolation data, and image reconstruction may be repeated (i.e., iterated) until the desired degree of extrapolation artifact reduction is achieved.

Figure 8:
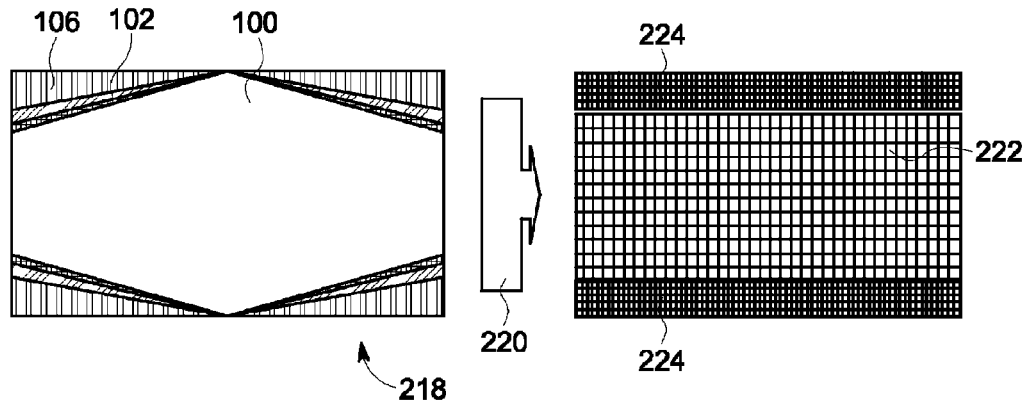
FIG. 8 depicts a parallel reprojection of axial scan data into corresponding low- and high-resolution regions.

In another embodiment, the present approach, which is generally directed to the correction of missing frequencies due to z-truncation, may be combined with other approaches that address missing frequencies attributable to other causes, such as due to cone-beam geometry. In such combination approaches, the approach directed to addressing missing frequencies due to cone-beam geometry may employ low resolution in-plane in a corresponding forward projection step as the corresponding frequency patching is in the low frequencies in-plane. Conversely, the present approach directed to addressing missing frequencies due to z-truncation may patch in frequencies at the higher in-plane frequencies, higher resolution, and for more views. That is, turning to FIG. 8, the axial scan data 218 (as discussed with respect to FIG. 2) may be undergo a parallel reprojection process 220 that generates a data having a low-resolution region 222 suitable for extracting missing frequency data where the missing frequencies are attributable to cone-beam geometry and high resolution regions 224 suitable for extracting missing frequency data where the missing frequencies are attributable to z-truncation. A tilted filtration process may then be employed to extract the missing frequencies that may then be patched into the measured data.

Figure 9:
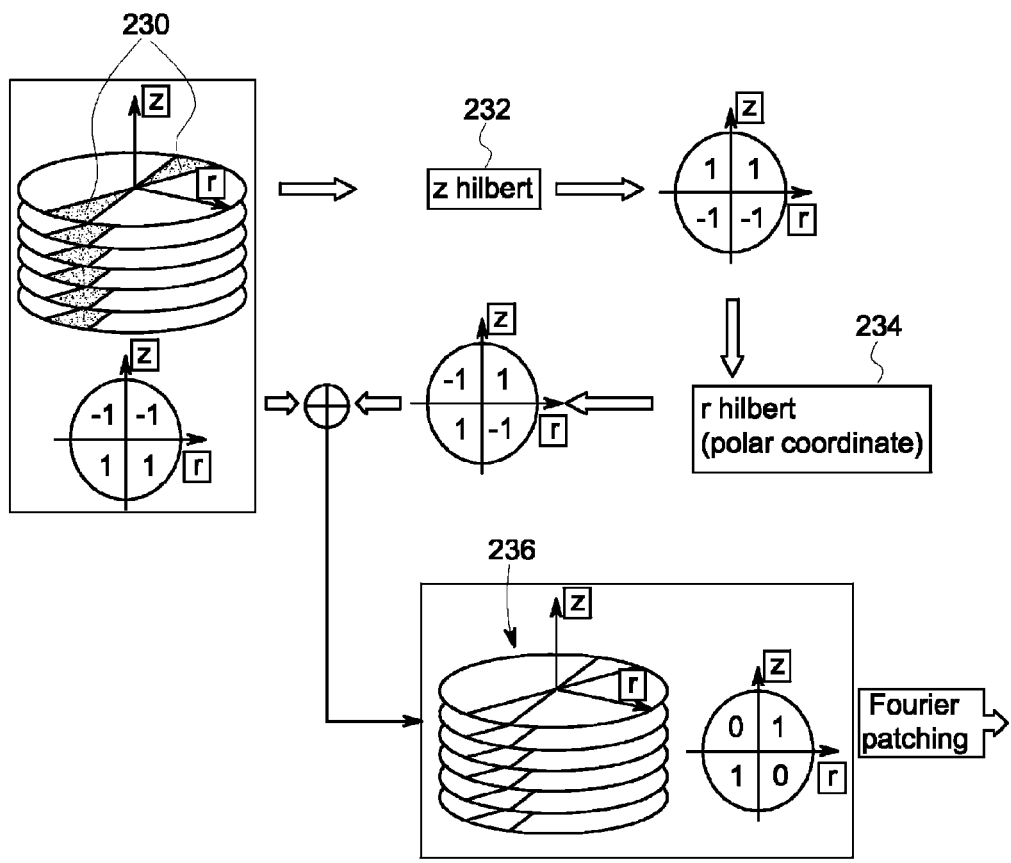
FIG. 9 depicts the use of Hilbert transforms in a frequency patching process, in accordance with aspects of the present disclosure.

Turning to FIG. 9, in another embodiment, to minimize corruption of good frequencies during the patching process, a simple z filter may be employed to patch only those 90 degree pie region pairs 230 in 3D frequency space. This can be done through two Hilbert transforms (a Hilbert transform 232 along z direction and a Hilbert transform 234 along radius direction). The z Hilbert transform 232 is straight forward, and may include tuning for the very edge slices. The radius direction Hilbert transform 234 may be performed in a rebinned polar coordinate system for improved computational performance. After the two filtrations 232, 234, the filtered images 236 only have frequencies in the pairs of 90 degree pie regions 230. The filtered images 236 may be processed by Fourier blending as described above.

Figure 10:
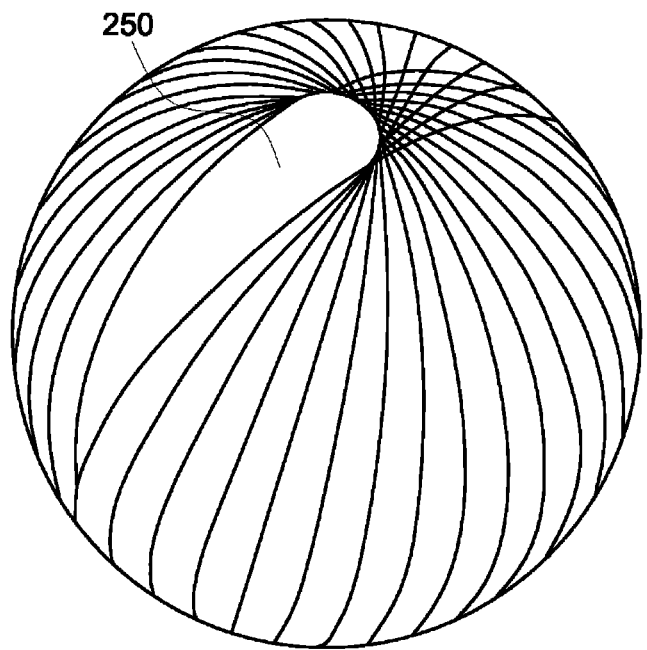
FIG. 10 depicts a region swept out by a circle in frequency space over a 180 degree range for a point outside the scan plane such that frequencies are missing.
Figure 11:
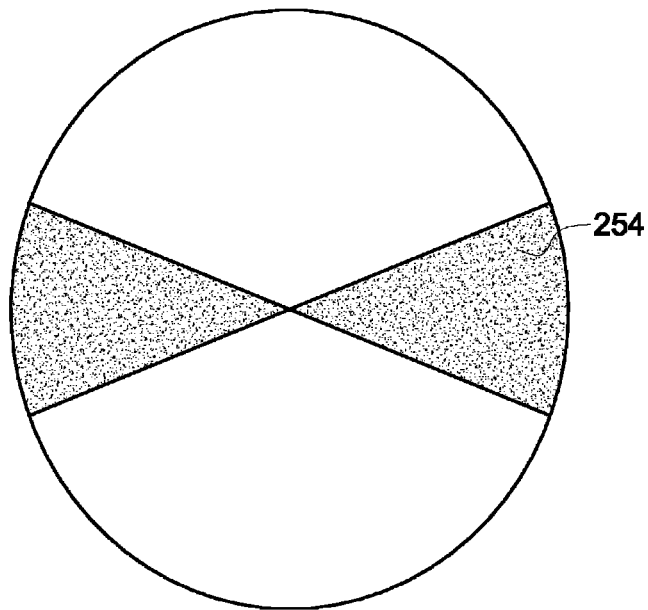
FIG. 11 depicts a pie-shaped filter for use in a frequency patching process, in accordance with aspects of the present disclosure.
Figure 12:
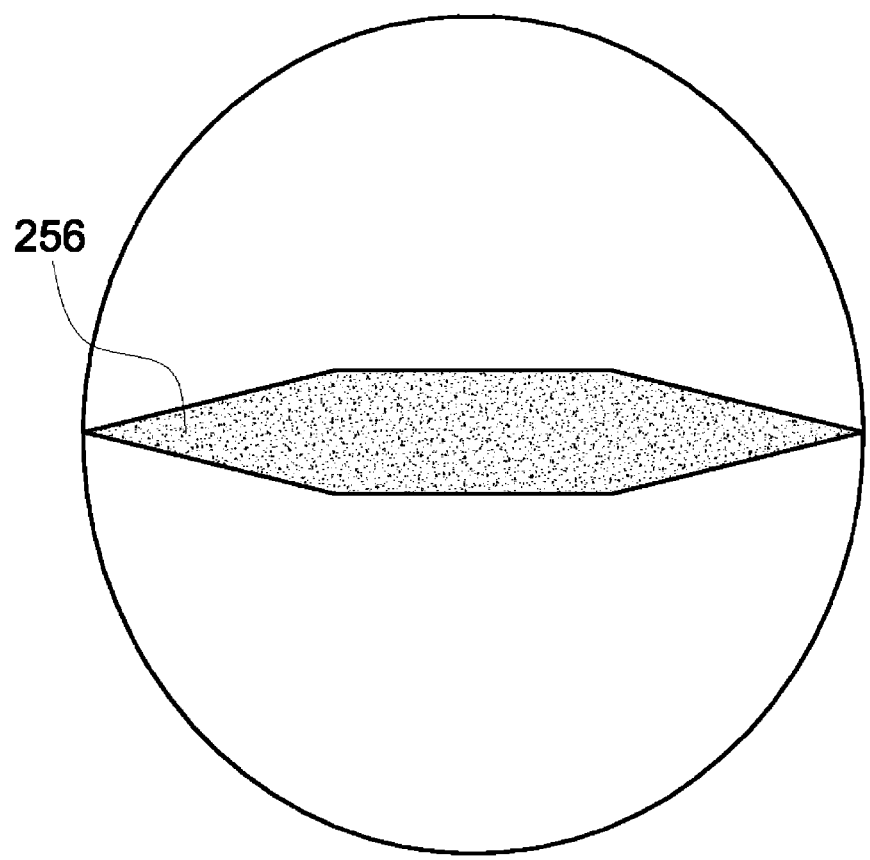
FIG. 12 depicts a differently shaped filter for use in a frequency patching process, in accordance with aspects of the present disclosure.

In a further embodiment, different shapes of filters may be employed in the Fourier domain to patch in data more accurately. For example, as shown in FIG. 10, the extrapolated data are mainly contributing to a "tear-drop" shape region 250, which is wider at the center and narrower further away. Use of a pie-shaped filter 254 (as depicted in FIG. 11) may be less than optimal. Therefore, in certain implementations, a differently shaped filter (such as filter 256 depicted in FIG. 12) may be employed that is wider at DC and narrower further away.

While the preceding describes certain implementations of approaches for addressing missing frequency data it should be appreciated that such approach may be implemented in an iterative manner when suitable. For example, a compressed sensing technique may be employed that uses total variation to penalize image artifacts and least squares to match measured data. Such an approach may pass through a set number of iterations of the above steps or may repeat iteratively until some cost function or other termination criteria are met.

Further, while the preceding discussion has generally been cast in the context of cone-beam CT to provide a meaningful example and to illustrate the principles involved, the present approaches are suitable for use in other image reconstruction contexts where voxels are reconstructed from limited view angles (e.g., with less than 180 degrees of data). For example, the approaches discussed herein may be employed in a tomosynthesis implementation where an object outside the scanning field of view is to be reconstructed or where reconstruction is performed for a regions near high-density objects, and so forth. Another example where the present approaches may be applicable would be metal artifacts reduction (MAR). For example, the projection information may be blocked by the heavy metal implants in patients. The information to reconstruct other regions may be incomplete due to those metal blocked missing views. The present approaches can be used to recover such lost information and reduce artifacts.

Technical effects of the invention include recovering missing/corrupted frequencies in frequency space to allow for correction of certain types of image artifacts, such as cone-beam artifacts. One technical effect is the construction of a non-linear transformation from an initial reconstruction using a non-linear function. Frequencies missing in the initial reconstruction may be extracted from the non-linear transformation and added to the initial reconstruction so that the resulting reconstruction is substantially complete in frequency space.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for processing tomographic image data, comprising:
   reconstructing an initial volume from a set of axial scan data, wherein the initial volume comprises incomplete frequency data;
   generating a modified volume from the initial volume by applying a non-linear transformation, wherein the non-linear transformation introduces frequencies missing from the initial volume;
   generating an artifact mask, wherein the artifact mask identifies artifact regions impacted by the frequencies missing from or corrupted in the initial volume;
   combining the initial volume and the modified volume using a shift variant filtration process to produce a composite volume, wherein the shift variant filtration replaces missing or corrupted frequency information in the initial volume using the corresponding estimated frequency information available in the modified volume; and
   blending the composite volume with the initial volume based on the artifact mask to generate a corrected volume.

2. The method of claim 1, wherein the artifact mask is based at least in part on the scan geometry.

3. The method of claim 1, wherein the non-linear transformation is based on a binning process or other data quantization process.

4. The method of claim 3 wherein the binning process or other data quantization process is based on knowledge of the composition of object or subject being scanned.

5. The method of claim 1, wherein combining the initial volume and the modified volume is implemented as a piecewise shift-invariant process such that the aggregate combination of the initial volume and the modified volume is shift variant.

6. The method of claim 1, wherein the artifact mask is generated based on high contrast edge information in one or both of the initial volume and the modified volume.

7. The method of claim 6, wherein generating the artifact mask comprises identifying locations on high contrast edges in the image volume whose tangent planes are not orthogonal to the scan plane, wherein all measured X-ray paths that pass through the identified locations are oblique to the tangent plane.

8. The method of claim 1, wherein blending the composite volume with the initial volume based on the artifact mask limits the addition of missing frequencies to the initial volume to the artifact regions identified by the artifact mask.

9. The method of claim 1, wherein the application of the shift variant filtration process comprises performing a two-dimensional reprojection, performing a ramp filtering operation, and performing a backprojection with a spatially-variant weighting function.

10. The method of claim 1, wherein application of the shift variant filtration is achieved by filtering an image in a polar coordinate frame or other suitable coordinate frame.

11. The method of claim 1, wherein the shift-variant filtration process utilizes a two-dimensional filter.

12. The method of claim 1, wherein the shift-variant filtration process utilizes a separable three-dimensional filter having separable two-dimensional components and one-dimensional components.

13. One or more non-transitory computer-readable media, encoding one or more routines which, when executed by a processor, cause the processor to perform acts comprising:
   reconstructing an initial volume from a set of axial scan data, wherein the initial volume comprises incomplete frequency data;
   generating a modified volume from the initial volume by applying a non-linear transformation, wherein the non-linear transformation introduces frequencies missing from the initial volume;

generating an artifact mask, wherein the artifact mask identifies artifact regions impacted by the frequencies missing from the initial volume;

combining the initial volume and the modified volume using a shift variant filtration process to produce a composite volume, wherein the shift variant filter replaces missing or corrupted frequency information in the initial volume using the corresponding estimated frequency information available in the modified volume; and blending the composite volume with the initial volume based on the artifact mask to generate a corrected volume.

14. The one or more non-transitory computer-readable media of claim 13, wherein the non-linear transformation is based on a binning process or other data quantization process.

15. The one or more non-transitory computer-readable media of claim 13, wherein the artifact mask is generated based on high contrast edge information in one or both of the initial volume and the modified volume.

16. The one or more non-transitory computer-readable media of claim 13, wherein blending the composite volume with the initial volume based on the artifact mask limits the addition of missing frequencies to the initial volume to the artifact regions identified by the artifact mask.

17. An image processing system, comprising:
a memory storing one or more routines, and
a processing component configured to execute the one or more routines stored the memory, wherein the one or more routines, when executed by the processing component:
reconstruct an initial volume from a set of axial scan data, wherein the initial volume comprises incomplete frequency data;
generate a modified volume from the initial volume by applying a non-linear transformation, wherein the non-linear transformation introduces frequencies missing from the initial volume;
generate an artifact mask, wherein the artifact mask identifies artifact regions impacted by the frequencies missing from the initial volume;
combine the initial volume and the modified volume using a shift variant filtration process to produce a composite volume, wherein the shift variant filter replaces missing or corrupted frequency information in the initial volume using the corresponding estimated frequency information available in the modified volume;
blend the composite volume with the initial volume based on the artifact mask to generate a corrected volume; and
display an image based on the corrected volume;
a display in communication with the processing component for displaying the image.

18. The image processing system of claim 17, wherein the non-linear transformation is based on a binning process or other data quantization process.

19. The image processing system of claim 17, wherein the artifact mask is generated based on high contrast edge information in one or both of the initial volume and the modified volume.

20. The image processing system of claim 17, wherein blending the composite volume with the initial volume based on the artifact mask limits the addition of missing frequencies to the initial volume to the artifact regions identified by the artifact mask.

* * * * *